(12) United States Patent
Matusima (10) Patent No.: US 7,419,464 B2
(45) Date of Patent: Sep. 2, 2008

(54) ROTOR MOUNTING STRUCTURE FOR CENTRIFUGAL SEPARATOR

(75) Inventor: Souichirou Matusima, Tokyo (JP)

(73) Assignee: Tomy Kogyo Co., Ltd., Tokyo (JP)

( * ) Notice: Subject to any disclaimer, the term of this patent is extended or adjusted under 35 U.S.C. 154(b) by 455 days.

(21) Appl. No.: 11/224,236

(22) Filed: Sep. 13, 2005

(65) Prior Publication Data
US 2006/0058169 A1    Mar. 16, 2006

(30) Foreign Application Priority Data
Sep. 15, 2004  (JP) .............................. 2004-267891

(51) Int. Cl.
B04B 9/00 (2006.01)
B04B 5/02 (2006.01)

(52) U.S. Cl. .................. 494/84; 494/16; 403/322.2; 403/330

(58) Field of Classification Search .................. 494/12, 494/16, 20, 84, 85; 403/109.2–109.3, 109.8, 403/326, 330, 322.2, DIG. 4, DIG. 6; 464/182
See application file for complete search history.

(56) References Cited

U.S. PATENT DOCUMENTS

| | | | | |
|---|---|---|---|---|
| 2,865,662 A | * | 12/1958 | Nurmse | 403/325 |
| 2,982,586 A | * | 5/1961 | Gliebe | 403/109.3 |
| 4,193,538 A | * | 3/1980 | Schwarz | 494/16 |
| 5,681,257 A | * | 10/1997 | Letourneur | 494/12 |
| 6,056,684 A | * | 5/2000 | Linder et al. | 494/12 |
| 6,063,018 A | * | 5/2000 | Letourneur | 494/12 |
| 6,071,035 A | * | 6/2000 | McKelvy | 403/322.2 |
| 6,149,571 A | * | 11/2000 | Okada et al. | 494/20 |
| 6,390,965 B1 | * | 5/2002 | Matsushima | 494/16 |
| 6,554,524 B1 | * | 4/2003 | Smith | 403/322.2 |
| 7,311,652 B2 | * | 12/2007 | Henne | 494/12 |

FOREIGN PATENT DOCUMENTS

| | | | | |
|---|---|---|---|---|
| JP | 06134343 A | * | 5/1994 | |
| JP | 7-861 | * | 1/1995 | |
| JP | 10-216562 | * | 9/1998 | |

* cited by examiner

Primary Examiner—Charles E Cooley
(74) Attorney, Agent, or Firm—Posz Law Group, PLC (57) ABSTRACT

A rotor mounting structure arranged in a centrifugal separator. A cylindrical shaft having elastic tongue pieces provided substantially equidistantly on the peripheral edge of the upper surface of the cylindrical shaft is provided at the distal end of a drive shaft; the tongue pieces have hooks; a shaft accommodation orifice accommodates the cylindrical shaft is formed in the center of the rotor; elastic tongue piece insertion grooves mate with the elastic tongue pieces of the cylindrical shaft; the rotor is joined to the cylindrical shaft, while bending the elastic tongue pieces; and in a state in which the rotor is completely joined to the cylindrical shaft by engaging the hooks of the elastic tongue pieces with the upper edges of the grooves of the rotor by the elastic force of the elastic tongue pieces.

5 Claims, 7 Drawing Sheets

ROTOR MOUNTING STRUCTURE FOR CENTRIFUGAL SEPARATOR

BACKGROUND OF THE INVENTION

1. Field of the Invention

The present invention relates to a rotor mounting structure for a centrifugal separator, and more particularly to a rotor mounting structure for a centrifugal separator in which the rotor is one-touch mounted on a drive shaft.

2. Description of the Related Art

For example, in small centrifugal separators such as used, e.g., for DNA and RNA purification operations in the field of generating engineering, a rotor is formed from a lightweight material such as a synthetic resin and this rotor is joined to a drive shaft of the motor by tightening with a screw (for example, Japanese Patent Application Laid-open No. H10-328582).

SUMMARY OF THE INVENTION

In a small centrifugal separator such as described in Japanese Patent Application Laid-open No. H10-328582, a boss extending downwardly is formed in the central portion of the rotor, a drive shaft accommodation orifice that is open downwardly is formed in the boss, a threaded hole is provided from the peripheral surface of the orifice toward the shaft center, the drive shaft accommodation orifice of the rotor is fitted onto the drive shaft of the motor, and then the rotor is joined to the drive shaft with a screw that is screwed in the threaded hole from the side of the rotor.

Thus, in the centrifugal separator such as described in Japanese Patent Application Laid-open No. H10-328582, when the rotor is mounted on the drive shaft, a tool such as a screwdriver is required, the screwing operation has to be conducted from the side, and operability is poor.

Furthermore, with certain rotors, a screwdriver insertion hole has to be formed in the side edge section of the rotor and the screw has to be rotated by inserting the shaft of the screwdriver into this hole. As a result, special screwdrivers with a long shaft have to be used.

With the foregoing in view, it is an object of the present invention to provide a rotor mounting structure for a centrifugal separator that enables easy one-touch mounting of the rotor on the drive shaft, without using a tool such as a screwdriver.

In order to resolve the above-described problems, the rotor mounting structure for a centrifugal separator according to a first embodiment, comprises, at the distal end of a drive shaft, a cylindrical shaft, in which a plurality of elastic tongue pieces provided substantially equidistantly on the peripheral edge of the upper surface of the cylindrical shaft extend upward from the upper surface and have hooks formed so as to protrude radially outwardly at the upper ends thereof; a shaft accommodation orifice which is open downward and accommodates the cylindrical shaft is formed in the center of the rotor: elastic tongue piece insertion grooves for inserting the elastic tongue pieces therethrough are provided through the upper wall of the shaft accommodation orifice: the elastic tongue piece insertion grooves of the rotor are mated with the elastic tongue pieces of the cylindrical shaft; the rotor is joined to the cylindrical shaft, while bending the elastic tongue pieces; and in a state in which the rotor is completely joined to the cylindrical shaft, the rotor is locked to the cylindrical shaft by engaging the hooks of the elastic tongue pieces with the upper edges of the grooves of the rotor by the elastic force of the elastic tongue pieces.

In the rotor mounting structure of a centrifugal separator of a second embodiment, in the first embodiment, the cylindrical shaft is formed separately from the drive shaft, a drive shaft accommodation orifice which is open downwardly is formed in the center of the cylindrical shaft: and the cylindrical shaft is integrally coupled with the drive shaft after the drive shaft accommodation orifice has been joined to the drive shaft.

In the rotor mounting structure of a centrifugal separator of a third embodiment, in the first embodiment, a taper surface expanding downwardly is formed at the inner peripheral surface of the shaft accommodation orifice of the rotor, and a taper surface corresponding to the inner peripheral surface of the shaft accommodation orifice of the rotor is formed at the outer peripheral surface of the cylindrical shaft.

In the rotor mounting structure of a centrifugal separator of a fourth embodiment, in the first embodiment, a cap is provided that covers portions of tongue pieces of the cylindrical shaft which protrude from the upper surface of the rotor.

In the rotor mounting structure of a centrifugal separator of a fifth embodiment, a cylindrical shaft, in which a plurality of protrusions or protrusion accommodation grooves extending in the up-down direction are formed substantially equidistantly on the peripheral surface, is provided at the distal end of a drive shaft; a shaft accommodation orifice which is open downward and accommodates the cylindrical shaft is formed in the center of the rotor; protrusion accommodation grooves or protrusions corresponding to the protrusions or protrusion accommodation grooves of the cylindrical shaft are formed in the inner peripheral surface of the shaft accommodation orifice; a ball, which is impelled in the direction of protruding and can be protruded and withdrawn back, is provided in one of the mutually corresponding portions of the peripheral surface of the cylindrical shaft and the shaft accommodation orifice of the rotor, a ball accommodation recess for accommodating the ball is formed in the other corresponding portion; and after the protrusions and the protrusion accommodation grooves have been mated, the shaft accommodation orifice of the rotor has been joined to the cylindrical shaft, and the rotor has been completely joined to the cylindrical shaft, the rotor is locked to the cylindrical shaft by engaging the ball with the ball accommodation recess.

With the above-described the first embodiment, the rotor can be one-touch locked to the drive shaft by dropping the rotor from above onto the cylindrical shaft. Furthermore, the rotor can be removed from the drive shaft by bending the respective hooks inwardly and, therefore" the rotor can be easily mounted and dismounted.

Furthermore, with the above-described the second embodiment, in addition to the above-described effect, the manufacturing process is facilitated because the cylindrical shaft of complex shape can be formed separately from the drive shaft of the motor.

Furthermore, with the above-described third embodiment, in addition to the above-described effects, centering of the rotor with respect to the cylindrical shaft can be conducted reliably and the rotor can be reliably attached to the cylindrical shaft.

Furthermore, with the above-described the fourth embodiment, in addition to the above-described effects, after the rotor has been mounted on the cylindrical shaft, no external force can act on the hooks and, therefore, the rotor cannot be inadvertently removed from the cylindrical shaft.

Furthermore, with the above-described the fifth embodiment, the rotor and the cylindrical shaft of the drive shaft are prevented from rotating with respect to each other by the protrusions and protrusion accommodation grooves formed therein, and the rotor is prevented from falling off from the cylindrical shaft by engaging the ball with the ball accommodation recess.

Therefore, the rotor can be easily mounted on the drive shaft and can be easily dismounted from the drive shaft with a simple structure.

DESCRIPTION OF THE PREFERRED EMBODIMENTS

The above-described rotor mounting structure of a centrifugal separator in accordance with the present invention will be described below in greater detail with reference to the appended drawings.

Figure 1:
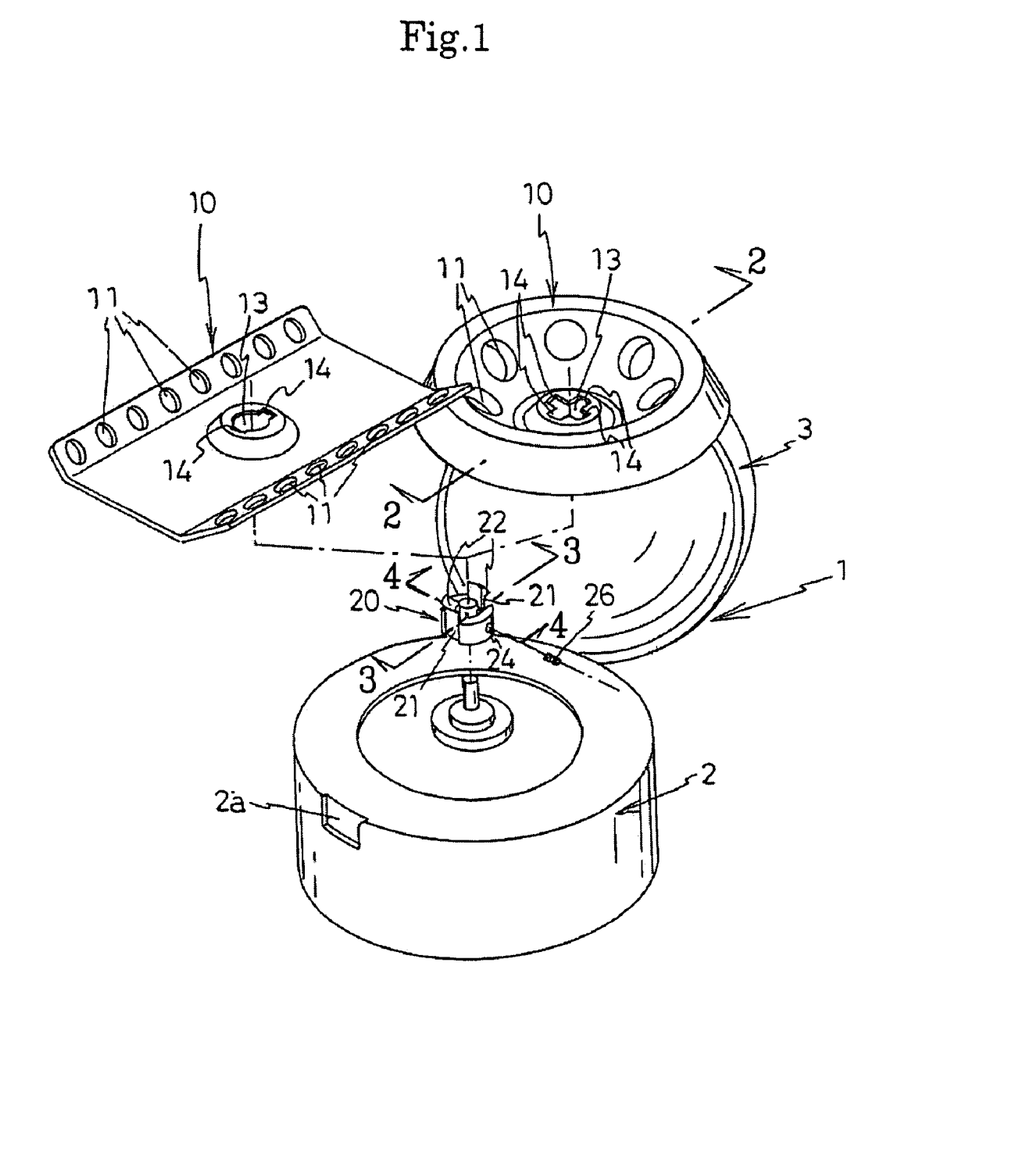
FIG. 1 is a perspective view illustrating a centrifugal separator comprising the rotor mounting structure in accordance with the present invention.
Figure 2:
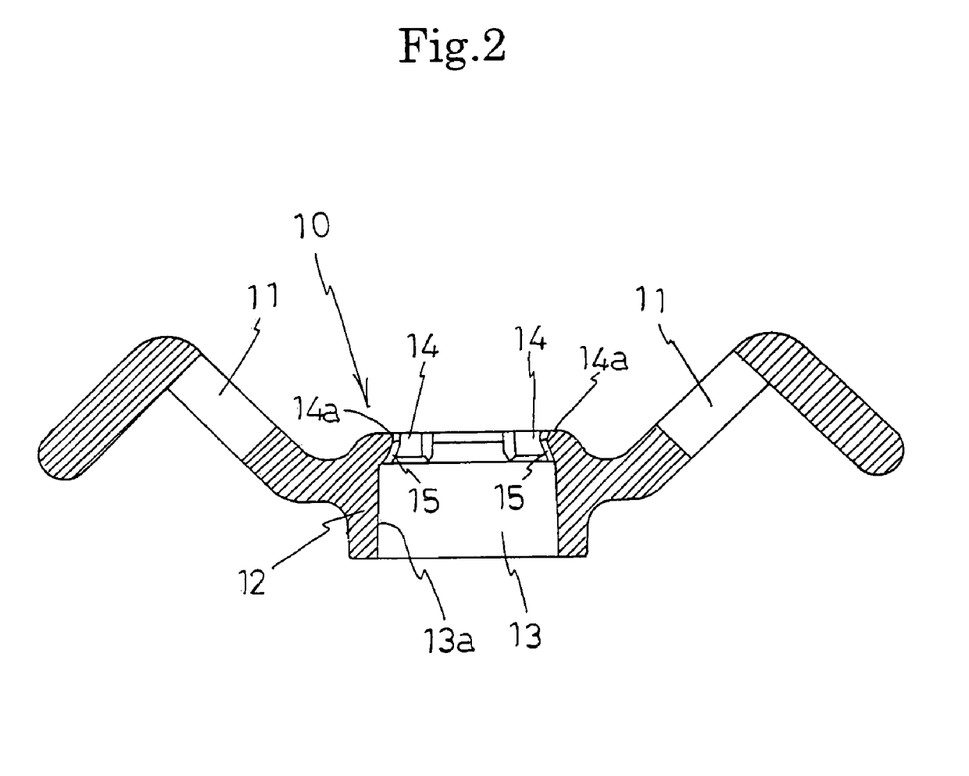
FIG. 2 is a cross-sectional view of the section along the 2-2 line of the rotor shown in FIG. 1.
Figure 3:
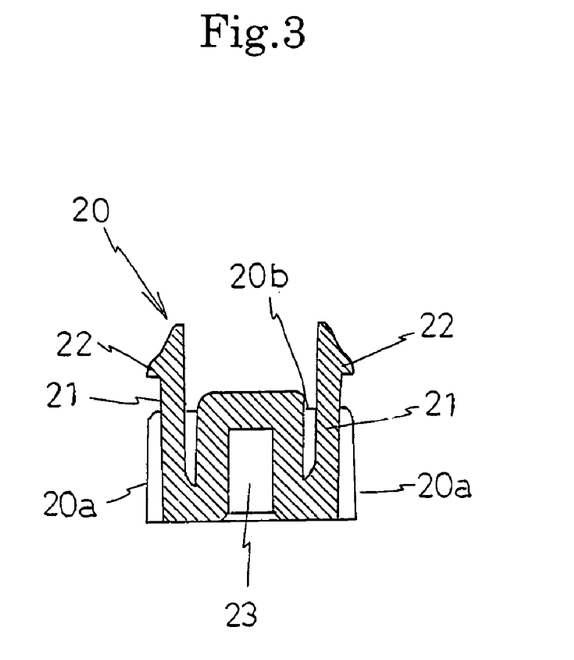
FIG. 3 is a cross-sectional view of the section along the 3-3 line of a cylindrical shaft shown in FIG. 1.
Figure 4:
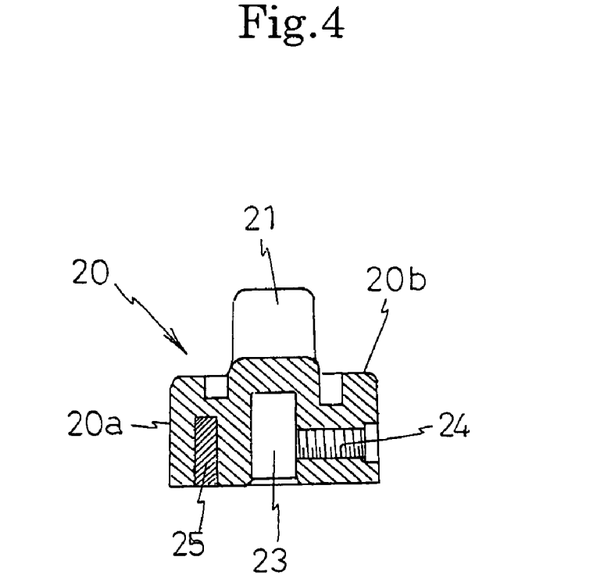
FIG. 4 is a cross-sectional view of the section along the 4-4 line of a cylindrical shaft shown in FIG. 1.
Figure 5:
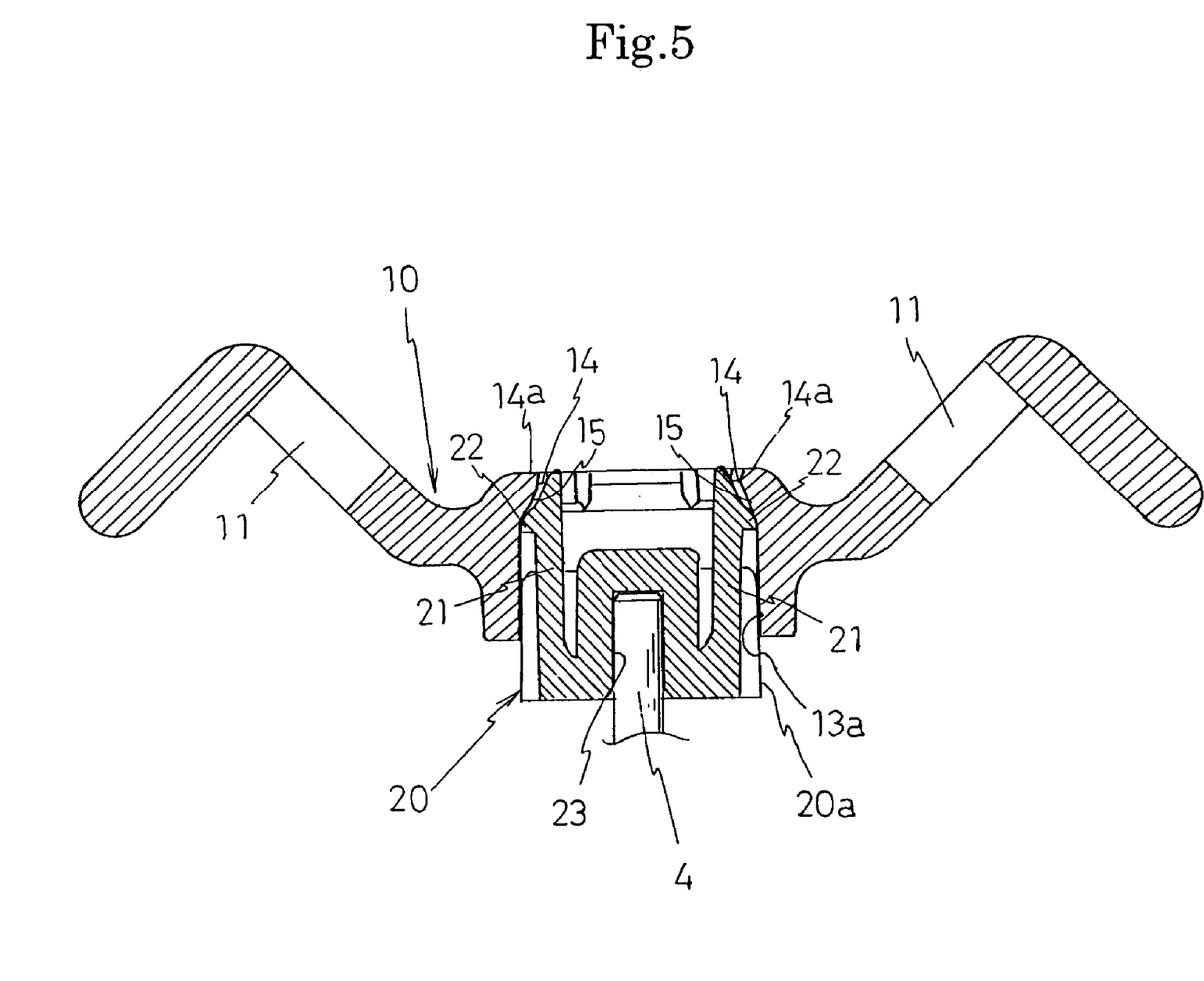
FIG. 5 is a cross-sectional view illustrating an intermediate state of mounting a rotor on a cylindrical shaft fixedly attached to a drive shaft.
Figure 6:
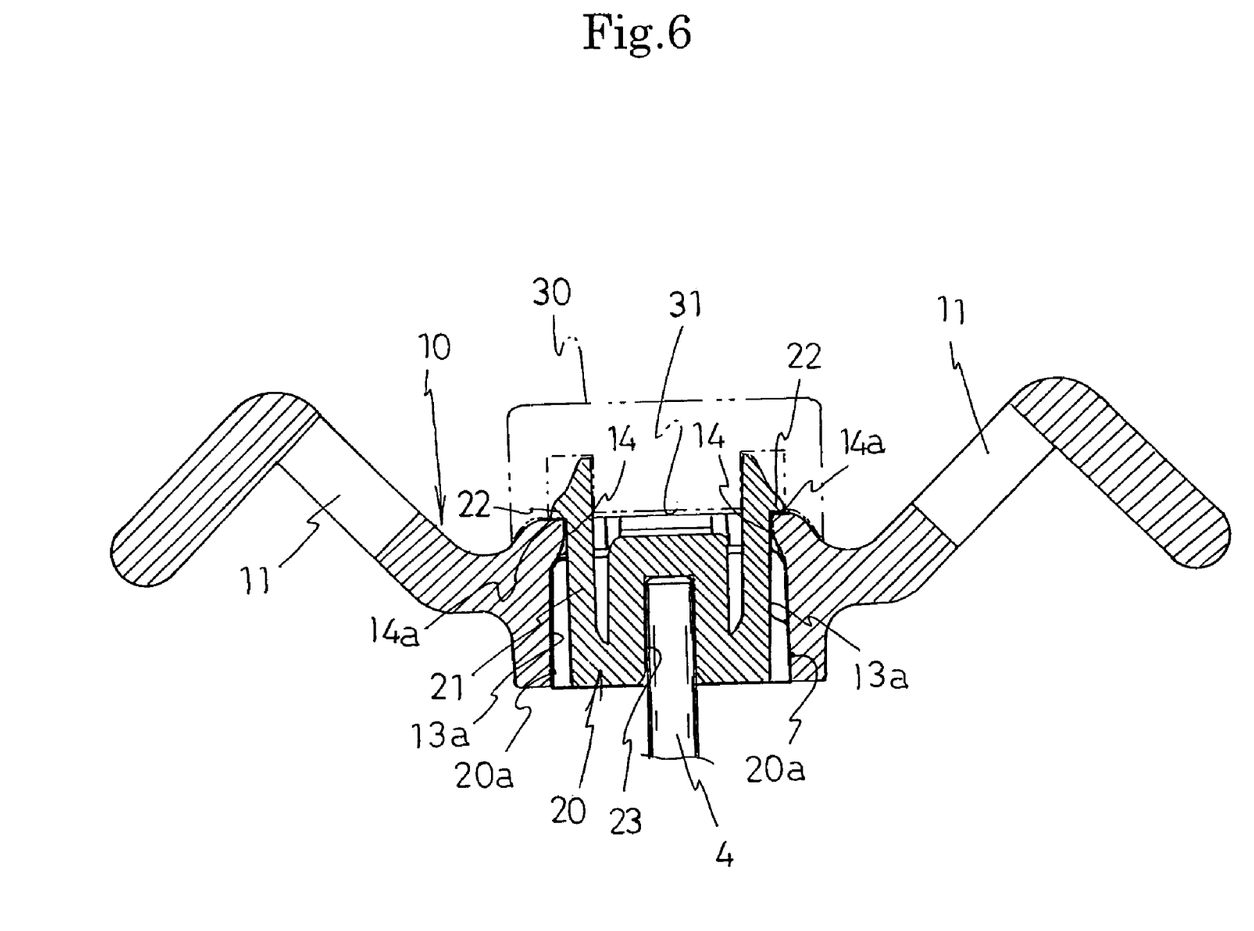
FIG. 6 is a cross-sectional view illustrating a state after the rotor has been mounted on the cylindrical shaft fixedly attached to the drive shaft.

Here, FIG. 1 is a perspective view illustrating schematically a centrifugal separator comprising the rotor mounting structure in accordance with the present invention. FIG. 2 is a cross-sectional view of the section along the 2-2 line of the rotor shown in FIG. 1. FIG. 3 is a cross-sectional view of the section along the 3-3 line of a cylindrical shaft shown in FIG. 1. FIG. 4 is a cross-sectional view of the section along the 4-4 line of a cylindrical shaft shown in FIG. 1. FIG. 5 is a cross-sectional view illustrating an intermediate state of mounting a rotor on a drive shaft. FIG. 6 is a cross-sectional view illustrating a state after the rotor has been mounted on the drive shaft.

The above-described centrifugal separator is a small centrifugal separator 1 such as used, e.g., for DNA and RNA purification operations in the field of genetic engineering and comprises a cylindrical apparatus body 2 and a semispherical lid 3 covering the upper surface of the apparatus body 2. Part of the lid 3 is pivotally mounted on the apparatus body 2 so that it can be opened and closed. A latch (not shown in the figure) formed in another part of the lid 3 can be engaged with a catch 2a formed in the upper peripheral surface of the apparatus body 2 to lock the lid 3 to the apparatus body 2.

A rotor 10 is formed from a synthetic resin and can be rectangular or round, as shown in FIG. 1. Those rotors 10 comprise tube accommodation orifices 11 in the side edge or peripheral edge thereof. Furthermore, a shaft section 12 protruding in the up-down direction is formed in the center of the rotor 10.

This shaft section 12, as shown in FIG. 2, has a shaft accommodation orifice 13 open downward in the central portion thereof, and the inner peripheral surface 13a of the shaft accommodation orifice 13 is formed by a taper surface that expands downwardly. Furthermore, two or four elastic tongue piece insertion grooves 14 corresponding to the below-described hooks of the cylindrical shaft are provided so as to pass through the upper wall of the shaft accommodation orifice 13, and the lower ends of the those grooves 14 are connected by the inner peripheral surface 13a of the shaft accommodation orifice 13 and an inclined surface 15.

As shown in FIG. 1, a drive shaft 4 of a motor installed inside the apparatus body 2 protrudes upward from the central portion of the apparatus body 2.

The cylindrical shaft 20 is formed from a synthetic resin. As shown in FIG. 3, the peripheral surface 20a of the cylindrical shaft 20 expands downwardly and is formed by a taper surface corresponding to the inner peripheral surface 13a of the shaft accommodation orifice 13 of the rotor 10. Furthermore, elastic tongue pieces 21 protruding upward from the upper surface 20b of the cylindrical shaft 20 are provided in corresponding zones of the peripheral surface. Hooks 22 protruding radially outwardly are formed at the upper ends of those elastic tongue pieces 21.

A drive shaft accommodation orifice 23 open at the lower surface is formed in the central portion of the cylindrical shaft 20. As shown in FIG. 4, a threaded hole 24 is formed toward the drive shaft accommodation orifice 23 in the peripheral surface 20a of the cylindrical shaft 20, and a balancer 25 is embedded in the zone of the cylindrical shaft which is opposite the threaded hole 24 via the drive shaft accommodation orifice 23.

The cylindrical shaft 20 is fixed to the drive shaft 4 by fitting the drive shaft accommodation orifice 23 thereof on the drive shaft 4 of the motor, screwing a screw 26 into the threaded hole 24, as shown in FIG. 1, and pressing the distal end thereof against the peripheral surface of the drive shaft 4.

Further, the rotor 10 is attached to the cylindrical shaft 20 by mating the elastic tongue piece insertion grooves 14 thereof with the elastic tongue pieces 21 of the cylindrical shaft 20, as shown in FIG. 5, and joining the rotor 10 to the cylindrical shaft 20, while bending the elastic tongue pieces 21.

As shown in FIG. 6, in a state in which the rotor 10 is completely joined to the cylindrical shaft 20, the rotor 10 is engaged with the cylindrical shaft 20 by engaging the hooks 22 of the elastic tongue pieces 21 with the upper surface 14a of the elastic tongue piece insertion grooves 14 of the rotor 10 by the elastic force of the elastic tongue pieces 21. Furthermore, in this state, the inner peripheral surface 13a of the rotor 10 is brought into intimate contact with the peripheral surface 20a of the cylindrical shaft 20 and centered with respect to the cylindrical shaft 20 of the rotor 10.

The rotor 10 in this state can be removed from the cylindrical shaft 20, by bending the respective tongue pieces 21 inwardly, removing the respective hooks 22 from the upper edges of the elastic tongue piece insertion grooves 14 of the rotor 10, and pulling the rotor 10 upward in this state.

Furthermore, with the rotor mounting structure of the present embodiment, there is a risk of the rotor 10 falling off the cylindrical shaft 20 when elastic tongue pieces 21 are bent inward and the rotor 10 is raised upward by any external force. In order to prevent such an event reliably, it is preferred that a cap 30, such as shown by a two-dot-dash line in FIG. 6, be provided.

This cap 30, for example, comprises a protruding section 31 that will be inserted between the elastic tongue pieces 21 and is locked with the rotor 10 so as to cover the elastic tongue pieces 21. An appropriate structure such as screwing or press joining can be employed for locking the cap 30 to the rotor 10.

In the above-described embodiment, the cylindrical shaft 20 was formed separately from the drive shaft 4 of the motor and the cylindrical shaft 20 was locked to the drive shaft 4, but the cylindrical shaft 20 may be formed integrally with the drive shaft 4.

Figure 7:
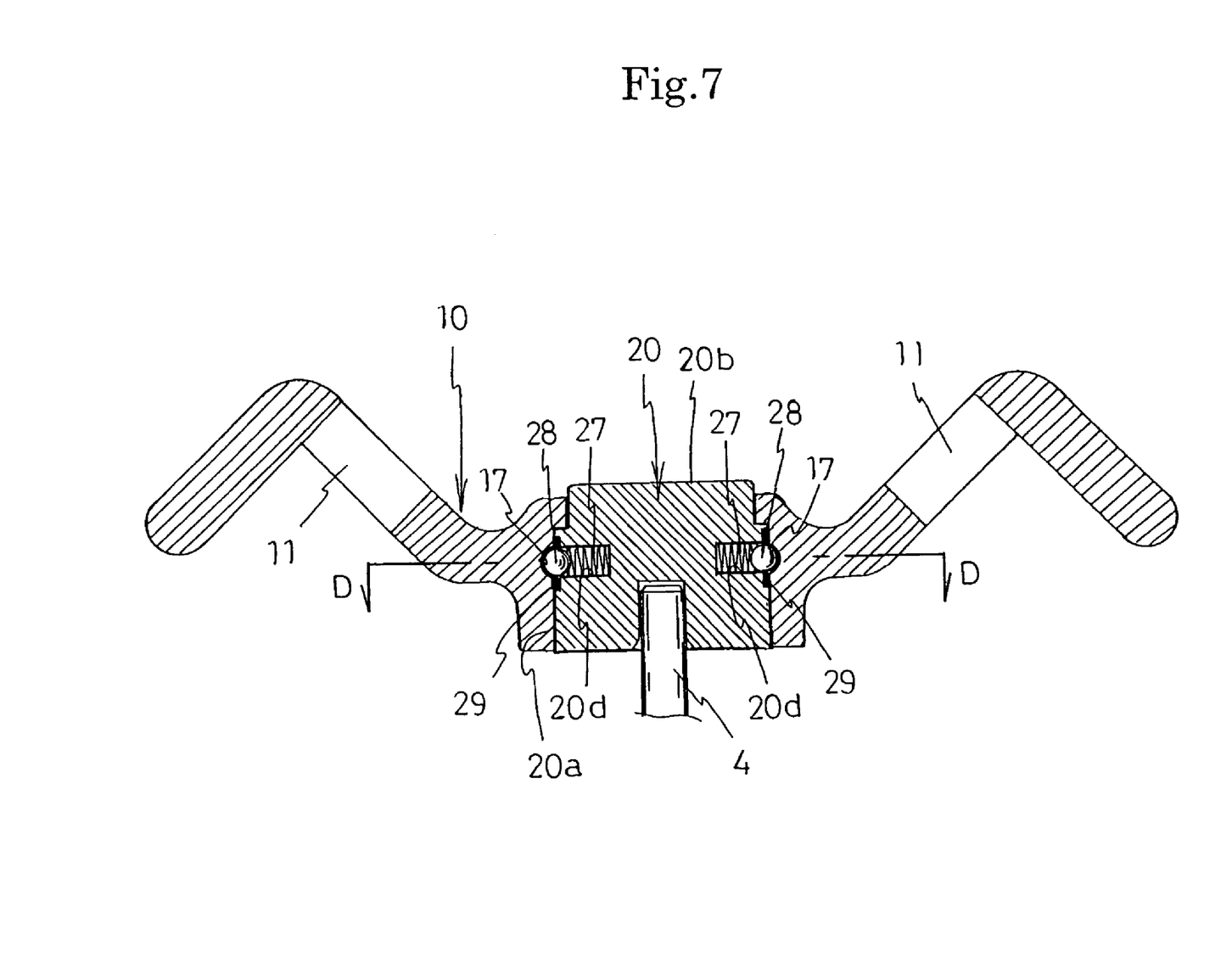
FIG. 7 is a cross-sectional view illustrating the other embodiment of the rotor mounting structure of the present invention.
Figure 8:
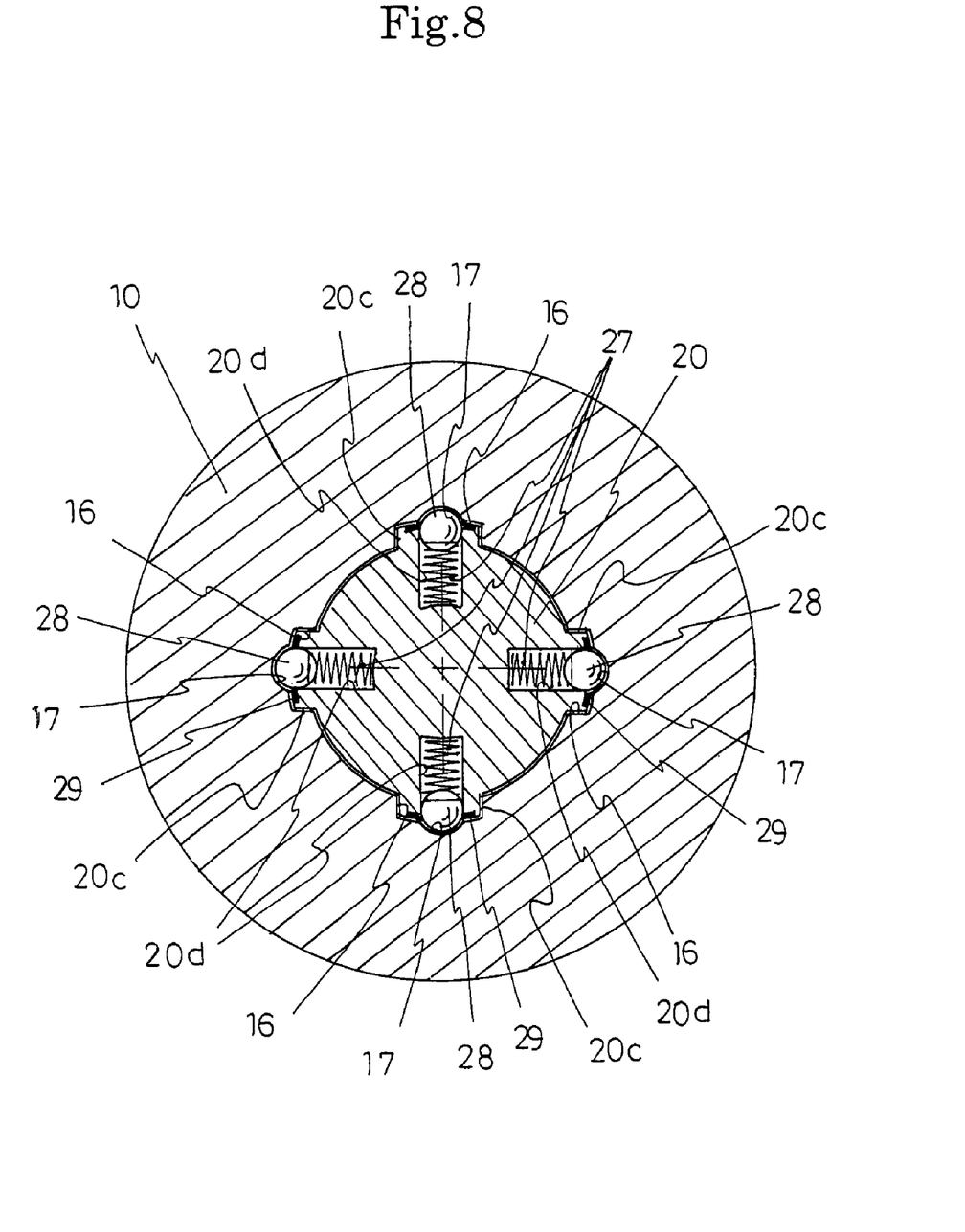
FIG. 8 is a cross-sectional view of the portion along the D-D line in FIG. 7.

FIG. 7 and FIG. 8 illustrate another embodiment of the rotor mounting structure of the present invention.

In the present embodiment, a plurality of protrusions 20c extending in the up-down direction are formed almost equidistantly on the peripheral surface 20a of the cylindrical shaft 20, and protrusion accommodation grooves 16 corresponding to the protrusions 20c of the cylindrical shaft 20 are formed in the inner peripheral surface 13a of the shaft accommodation orifice of the rotor 10. Furthermore, ball accommodation orifices 20d open at the peripheral surface of the protrusions are formed in the protrusions 20c of the cylindrical shaft 20. A spring 27 and a ball 28 are accommodated in the ball accommodation orifice, and the ball 28 is retained inside the ball accommodation orifice 20d by a ring 29 locked to the open edge of the ball accommodation orifice 20d and impelled outwardly by the spring 27. On the other hand, a ball accommodation recesses 17 for accommodating the balls 28 are formed in the bottom surface of the protrusion accommodation groove 16.

In the present embodiment, when the protrusions 20c are mated with the protrusion accommodation grooves 16 of the rotor 10, the shaft accommodation orifice 13 of the rotor 10 is joined to the cylindrical shaft 20, and the rotor 10 is completely joined to the cylindrical shaft 20, the rotor 10 is locked to the cylindrical shaft 20 by engaging the balls 28 with the ball accommodation recesses 17.

Furthermore, in the present embodiment, relative rotation of the rotor 10 and the cylindrical shaft 20 of the drive shaft 4 is prevented by the protrusions 20c and protrusion accommodation grooves 16 formed therein, and the rotor 10 is prevented form falling off the cylindrical shaft 20 by engaging the balls 28 in the ball accommodation recesses 17.

Moreover, in the present embodiment, the balls 28 were installed in the protrusions 20c, and the ball accommodation recesses 17 were formed in the protrusion accommodation grooves 16, but the balls 28 may be formed in the peripheral surface 20a of the cylindrical shaft 20 and the ball accommodation recesses 17 may be formed in the inner peripheral surface 13a of the shaft 12 of the rotor 10. Furthermore, the balls 28 may be installed in the rotor 10 and the ball accommodation recesses 17 may be formed in the cylindrical shaft 20.

Furthermore, in the present embodiment, the protrusions 20c were formed in the cylindrical shaft 20 and the protrusion accommodation grooves 16 for mating with the protrusions 20c were formed in the rotor 10, but the protrusions 20c may be conversely formed in the rotor 10 and the protrusion accommodation grooves 16 may be formed in the cylindrical shaft 20.

What is claimed is:

1. A rotor mounting structure for a centrifugal separator, comprising at the distal end of a drive shaft, a cylindrical shaft, in which a plurality of elastic tongue pieces provided substantially equidistantly on the peripheral edge of the upper surface of the cylindrical shaft extend upward from the upper surface and have hooks formed so as to protrude radially outwardly at the upper ends thereof, wherein a shaft accommodation orifice which is open downward and accommodates the cylindrical shaft is formed in the center of the rotor, elastic tongue piece insertion grooves for inserting the elastic tongue pieces therethrough are provided through the upper wall of the shaft accommodation orifice, the elastic tongue piece insertion grooves of the rotor are mated with the elastic tongue pieces of the cylindrical shaft, the rotor is joined to the cylindrical shaft, while bending the elastic tongue pieces, and in a state in which the rotor is completely joined to the cylindrical shaft, the rotor is locked to the cylindrical shaft by engaging the hooks of the elastic tongue pieces with the upper edges of the grooves of the rotor by the elastic force of the elastic tongue pieces.

2. The rotor mounting structure for a centrifugal separator according to claim 1, wherein the cylindrical shaft is formed separately from the drive shaft, a drive shaft accommodation orifice which is open downwardly is formed in the center of the cylindrical shaft, and the cylindrical shaft is integrally coupled with the drive shaft after the drive shaft accommodation orifice is joined to the drive shaft.

3. The rotor mounting structure for a centrifugal separator according to claim 1, wherein a taper surface expanding downwardly is formed at the inner peripheral surface of the shaft accommodation orifice of the rotor, and a taper surface corresponding to the inner peripheral surface of the shaft accommodation orifice of the rotor is formed at the outer peripheral surface of the cylindrical shaft.

4. The rotor mounting structure for a centrifugal separator according to claim 1, comprising a cap that covers portions of tongue pieces of the cylindrical shaft which protrude from the upper surface of the rotor.

5. A rotor mounting structure for a centrifugal separator, wherein a cylindrical shaft, in which a plurality of protrusions or protrusion accommodation grooves extending in the up-down direction are formed substantially equidistantly on the peripheral surface of the cylindrical shaft, is provided at the distal end of a drive shaft, a shaft accommodation orifice which is open downward and accommodates the cylindrical shaft is formed in the center of the rotor, protrusion accommodation grooves or protrusions corresponding to the protrusions or protrusion accommodation grooves of the cylindrical shaft are formed in the inner peripheral surface of the shaft accommodation orifice, a ball, which is impelled in the direction of protruding and can be protruded and withdrawn back, is provided in one of the mutually corresponding portions of the peripheral surface of the cylindrical shaft and the shaft accommodation orifice of the rotor, a ball accommodation recess for accommodating the ball is formed in the other corresponding portion, and after the protrusions and the protrusion accommodation grooves have been mated, the shaft accommodation orifice of the rotor has been joined to the cylindrical shaft, and the rotor has been completely joined to the cylindrical shaft, the rotor is locked to the cylindrical shaft by engaging the ball with the ball accommodation recess.

* * * * *